C. A. MORRIS.
CAR HAUL.
APPLICATION FILED FEB. 13, 1911.

1,000,106.

Patented Aug. 8, 1911.
3 SHEETS—SHEET 1.

Witnesses:
Inventor
CHARLES A. MORRIS
By Attorney

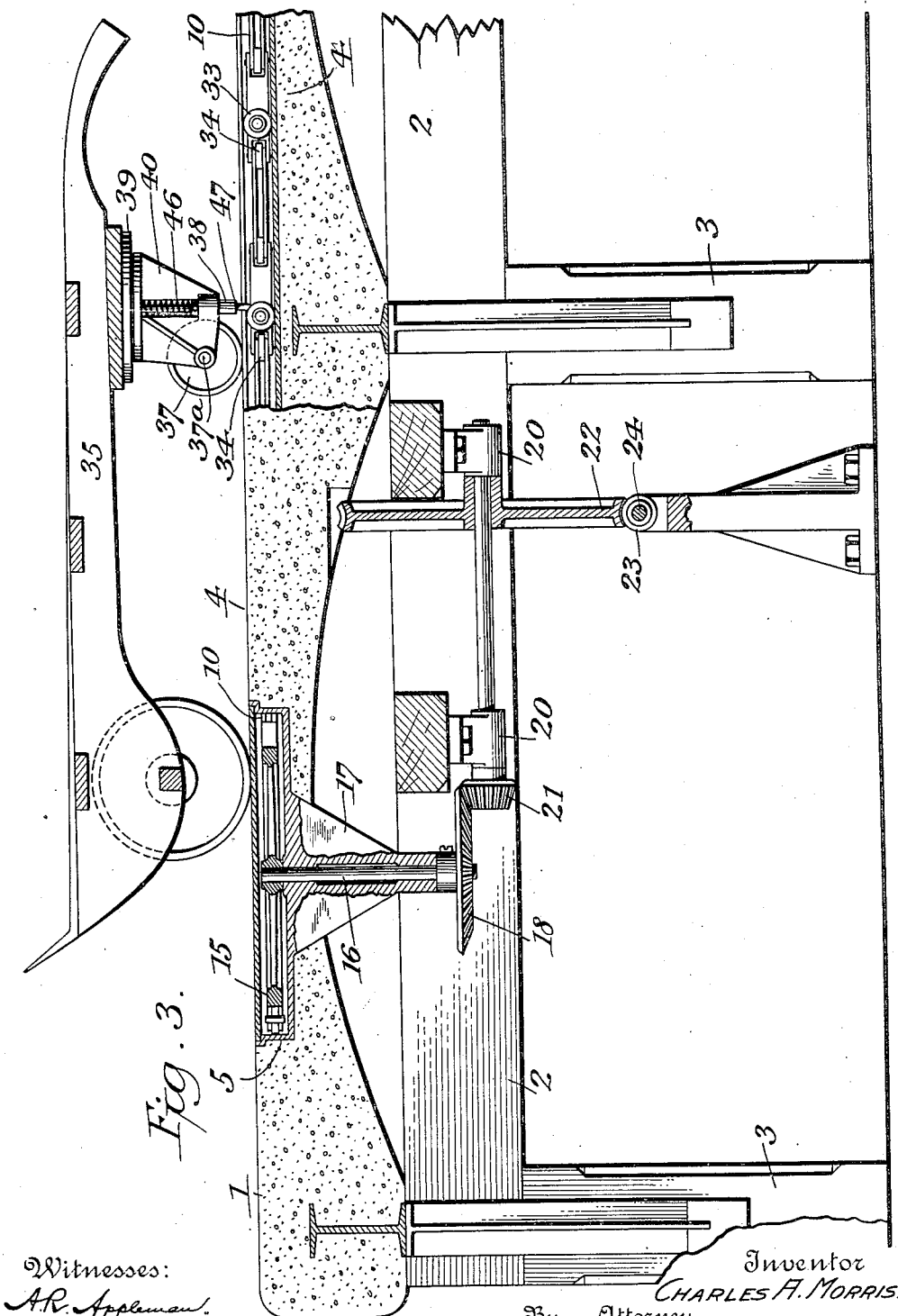

C. A. MORRIS.
CAR HAUL.
APPLICATION FILED FEB. 13, 1911.
1,000,106.
Patented Aug. 8, 1911.
3 SHEETS—SHEET 3.
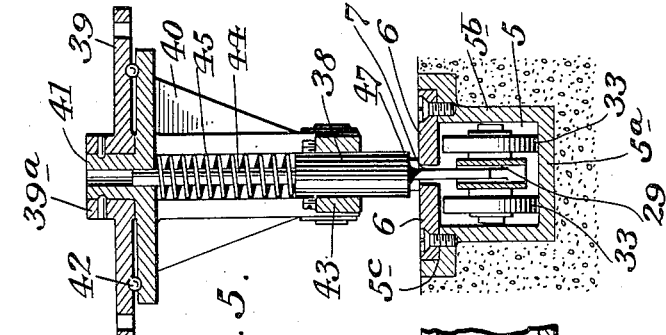
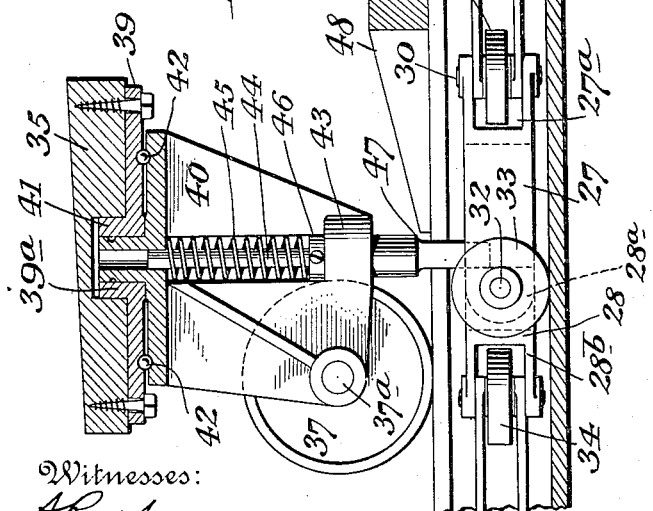
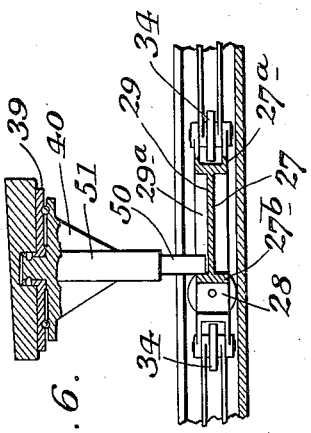
Witnesses:
A. R. Appleman
J. F. Mothershead
Inventor.
CHARLES A. MORRIS.
By Attorney
Griffins Bernhard

UNITED STATES PATENT OFFICE.

CHARLES A. MORRIS, OF MONTCLAIR, NEW JERSEY, ASSIGNOR TO OTIS ELEVATOR COMPANY, OF JERSEY CITY, NEW JERSEY, A CORPORATION OF NEW JERSEY.

CAR-HAUL.

1,000,106.  Specification of Letters Patent.  Patented Aug. 8, 1911.

Original application filed June 9, 1909, Serial No. 501,030. Divided and this application filed February 13, 1911. Serial No. 608,324.

*To all whom it may concern:*

Be it known that I, CHARLES A. MORRIS, a citizen of the United States, residing at Montclair, county of Essex, and State of New Jersey, have invented a certain new and useful Car-Haul, of which the following is a specification.

This invention is a car haul adapted for handling baggage or merchandise on loading or unloading platforms, on piers, at railroad stations, and in connection with pleasure vehicles at seaside resorts.

An apparatus embodying the invention pertains, more particularly, to a conveyer system wherein a chain operates in a below-level conduit, for the purpose of handling baggage or merchandise, or for hauling vehicles, wheeled trucks, etc., without the use of surface tracks.

The subject matter of this application is a division of a prior application filed by me on June 9, 1909, Serial No. 501,030.

The invention embodies a double-jointed chain operating within a conduit, said chain being operatively combined with wheeled trucks, cars, and the like, by the employment of a certain intermediate connection which operates to transmit the motion of the chain to the truck or car, the several parts being so combined that it is not necessary to provide tracks or other means for supporting, guiding or directing said cars or trucks. The flexible chain operates within the conduit so as to conform to the bends or corners of said conduit, thereby eliminating the necessity for sprocket wheels or guide rollers within the conduit.

A feature of the invention consists in providing an ordinary hand truck, barrow, or car with a caster wheel or pivoted truck, a trigger mechanism adapted for coöperation with the hauling chain, and a trip, whereby the truck, barrow or car may be disengaged automatically from the chain by the engagement of the trigger with the trip when the car or truck reaches a predetermined point.

In the accompanying drawings, I have illustrated different practical embodiments of the invention, but the constructions shown therein are to be understood as illustrative, only, and not as defining the limits of the invention.

Figure 1:
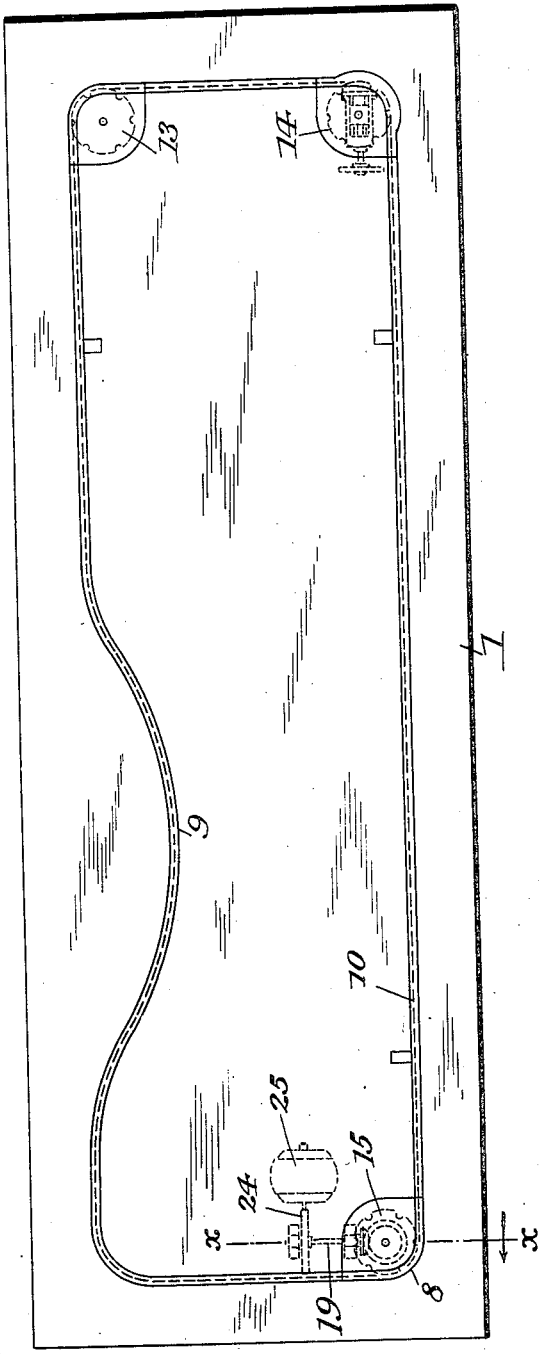
Figure 2:
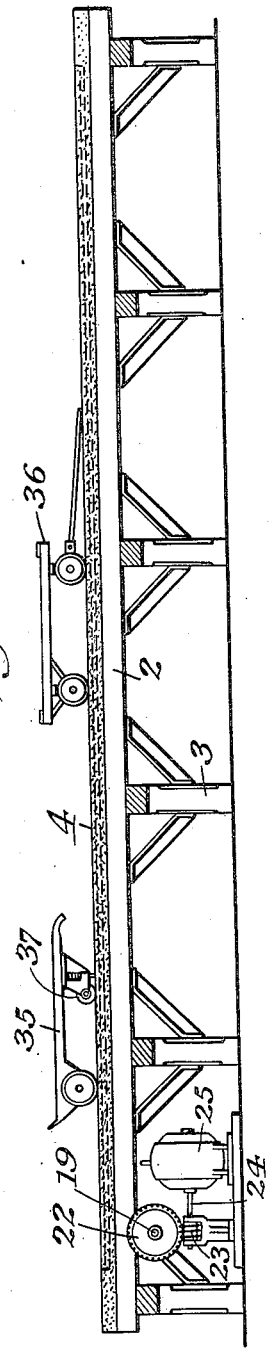

Figure 1 is a plan view illustrating my conveyer in operative relation to a pier or landing platform, such as are used for loading and unloading railway trains, steamships, and the like. Fig. 2 is a side elevation, partly in section, of the conveyer shown in Fig. 1, and illustrating different forms of load carrying trucks adapted to be propelled by the conveyer. Fig. 3 is a vertical section on the line $x$—$x$ of Fig. 1, illustrating the platform or pier and the conveying mechanism on an enlarged scale. Fig. 4 is a vertical longitudinal section through a part of the conveyer receiving conduit, the conveyer adapted to operate therein, and a latch mechanism whereby a wheeled truck may be connected with said conveyer. Fig. 5 is a vertical cross section through the conduit and the conveyer, illustrating the latch or trigger mechanism shown in Fig. 4. Fig. 6 is a vertical section, partly in elevation, illustrating one form of the latch or trigger mechanism for a truck whereby the weight of the load is supported, in whole or in part, by the conveyer chain.

The platform, 1, may be of any suitable or preferred construction, but, as shown in Figs. 2 and 3, it is of the kind employed as a loading stage for railways or the landing stage for steamships. As shown, the platform consists of a frame work, 2, supported on timbers, 3, and provided with a concrete floor, 4. It is evident, however, that the invention may be used in conjunction with any kind of platform, such as the boardwalk of inland or seaside resorts.

A conduit, 5, (consisting of a bottom 5$^a$ and side walls, 5$^b$) is installed in the concrete floor, 4, said conduit occupying a stationary position with respect to the platform. The conduit is constructed, preferably, in longitudinal sections, each section being cast so that the bottom, 5$^a$, and side walls, 5$^b$, are integral. The side walls, 5$^b$, are provided with recesses, 5$^c$, formed by the outward and upward extension of said walls, 5$^b$. Into the recesses, 5$^c$, are fitted suitable plates, 6, said plates being seated in the flanged upper edge of the conduit so that the upper edge of said plates will lie flush with the surface of the floor, 4. Provision is made for connecting or coupling a truck to a traveling or hauling chain, 10, by spacing the plates, 6, so that a slot, 7, is formed in the top of the conduit, at the inner edges of said plates. The conduit, 5, may be of any desired form in plan, but in Fig. 1, it is shown as substantially rectangular, with bends or corners, 8, and a deflected part, 9. Chain, 10, is adapted to travel within this conduit, 5, said chain being provided with weight carrying rollers and direction rollers, whereby said chain is adapted to guide or direct itself around the corners or bends in the conduit without the assistance of guide pulleys or sprocket wheels. However, it is not desired to limit the invention to a conduit wherein guide rollers or sprockets at the corners are omitted, and so far as concerns this feature the right is reserved to employ guide rollers or sprockets, 13, 14, shown in the upper and lower right hand corners of the conduit, while at the lower left hand corner of the conduit there is shown a driving sprocket, 15, positioned for engagement with the links of the roller chain, 10, in a manner to impart traveling motion thereto. Any suitable means may be employed for positively driving sprocket, 15, but in Fig. 3 said sprocket is shown as being secured rigidly to the upper part of a vertical shaft, 16. This shaft is mounted in bearings of a hanger, 17, depending from the floor, 4, of the platform, and on the lower end of this shaft, 16, is a bevel gear, 18. A horizontal countershaft, 19, is journaled in bearings, 20, and on one end of this shaft is a beveled pinion, 21, meshing with beveled gear, 18. A worm gear, 22, is provided on countershaft, 19, said gear, 22, meshing with worm, 23, on worm shaft, 24. The worm shaft is supported in appropriate bearings (not shown), and said shaft may be driven by an engine or motor, 25, of any kind.

The traveling chain, 10, is of double-jointed construction, comprising pairs of links, 26, and intermediate links, 27, 28. Link 28, is preferably a short link, and it is provided with a tongue or shank, 28ª, at one end and is bifurcated at its other end, as at 28ᵇ. Link, 27, is adapted to sustain the weight of a load. Said link, 27, is bifurcated at one end, 27ª, to correspond with the bifurcated end, 28ᵇ, of link 28. The other end of link, 27, is slotted, at 27ᵇ, to receive the tongue 28ª of link 28. The intermediate portion of link 27, between the ends 27ª and 27ᵇ, is shown as having a solid web, 29, provided with a longitudinal groove, 29ª, the purpose of which will be explained hereinafter. Links 26 are pivotally mounted within the bifurcated end, 27ª, of link 27, and within the bifurcated end, 28ᵇ, of link, 28.

Links 26 and 27 are connected by pintle, 30, and links 26 and 28 are joined by pintle, 31, said pintles, 30, 31, extending through the links of the chain in one direction, preferably, vertically. Tongue 28ª of link 28 is pivotally mounted within slotted end, 27ᵇ, of link 27, and it is held in this position by pintle, 31, said pintle, 31, extending through the links, preferably, at right angles to the position occupied by pintles, 30, 31. The chain is thus permitted to bend or flex in two directions, the pintles 30, 31, allowing the links to bend in a horizontal direction, while vertical flexure is secured by the pintles, 32.

Weight carrying rollers, 33, are mounted on pintles, 32, said rollers, 33, being preferably mounted in pairs exteriorly to the links (see Fig. 5) and on the end portions of pintles, 32. Within the bifurcated ends, 27ª and 28ᵇ, of links 27, 28, respectively, and preferably between the members of links 26, are mounted direction rollers, 34, on pintles 30 and 31. Rollers 33 sustain the weight of the chain and the load imposed thereon, and said rollers, also, reduce frictional contact between the chain and the bottom of the conduit. Rollers 34 reduce frictional contact with the walls of the conduit as the chain travels around the corners or bends in said conduit.

Various forms of wheeled trucks may be employed in conjunction with the conveyer system, such for example, as the ordinary two wheeled hand truck or barrow, 35, or the four-wheeled platform truck, 36, shown in Fig. 2. When the truck 35 is employed, I prefer to equip it with a caster wheel, 37, and with a trigger, 38, said trigger operating to engage with link 27 and thus connect the truck with the hauling chain.

As illustrated in Figs. 4 and 5, the caster wheel and trigger mechanism are united to the truck 35 by a bearing plate 39 having an up-standing boss, 39ª, and this plate may be firmly secured to the truck by bolts or screws. Coöperating with the bearing plate, 39, is a hanger, 40, which is provided with a stud, 41, fitting in said boss, 39ª. Bearing balls, 42, are positioned between the hanger, 40, and the bearing plate 39, whereby said bearing plate is free to turn in a horizontal plane. The hanger is provided with bearings for supporting the axle, 37ª, of the caster wheel, 37, and said hanger is also provided with a guide lug, 43, within which operates the spindle, 44, of the trigger, 38. Spindle 44 carries a collar, 46, upon which is seated a coiled spring, 45, said spring acting to depress the spindle and trigger with respect to the hanger and the truck. The trigger, 38, passes through the slot, 7, of the conduit, 5, and the lower end of this trigger is adapted to enter slot 29ª of link, 27, in the traveling chain, 10, or to enter any similar opening in said chain, 10.

A shoulder, 47, is provided near the lower part of the trigger, 38, said shoulder being adapted for engagement with a trip, 48, the latter being inclined, as shown in Fig. 4. Said trip is positioned in the path of shoulder, 47, for the purpose of lifting the trigger 38 against the tension of spring 45, whereby the trigger may be disengaged automatically from the chain when the truck reaches the point at which a load is to be discharged.

The four wheeled truck, 36, should be equipped with trigger mechanism similar to that described in connection with truck, 35, and illustrated in Figs. 4 and 5.

My conveyer system dispenses with surface tracks for guiding and directing wheeled cars adapted to transport baggage, merchandise, etc. The omission of surface tracks on the pier or platform, and the compact form of the conduit secures very great economy in the installation and construction of the new conveying system. In this system, the trucks are adapted to travel on the surface of the pier floor, said trucks being connected operatively with the running chain by the trigger device, and this trigger mechanism is carried in a hanger which has swiveled connection with the truck, whereby the trigger will follow the course of direction of travel of the chain, so as to haul the truck in the desired direction. The truck may be easily disconnected from the chain by lifting the trigger from the slot in the conduit, thus enabling a workman to wheel the truck to any desired position for placing a load thereon. After the truck shall have been loaded, it is wheeled back to the conduit, and the trigger is adjusted in the slot of said conduit for engagement with the hauling chain.

The chain, 10, operates to move a truck and its load from the loading point, or a place adjacent to the loading point, so as to transport the truck and its load to an unloading point, which may be a warehouse or other place of storage. Should the trip, 48 be provided at the unloading point, the trigger, 38, will engage with said trip, 48, so as to be withdrawn automatically from the chain, the latter continuing to run while the truck comes to rest.

The link, 29, illustrated in Fig. 6, is particularly adapted to sustain the weight of a load which is to be imposed by the trigger post upon said chain link, 29, the weight carrying rollers, 33, being mounted near the end, 29$^b$, of link, 27, where the greatest strain is exerted due to the trigger post bearing at this point.

It is not necessary that the trigger post, illustrated in Figs. 4 and 5, shall be a spring actuated device, for in Fig. 6 I have illustrated the trigger post, 50, as made integral with the hanger, 51, said hanger having a swiveled connection with the frame of a truck so that the hanger can turn relative to the truck. It is evident that two or four wheeled trucks may be equipped with the trigger post, 50, and when said post is inserted through the slot, 7, of conduit, 5, the lower end of said post, 50, will engage with link, 27, for the purpose of imposing the weight of the load upon the chain. The truck is hauled over the surface of the platform by the action of the trigger post, and said truck is adapted to be easily detached from the chain, or to be connected thereto, as desired.

While I have described my invention as adapted for handling baggage or merchandise, or in loading or unloading platforms, or on piers or at railway stations, it is evident that the invention is capable of other uses, for example, the hauling of pleasure vehicles to and fro on the boardwalks of seaside resorts, etc. Furthermore, the invention is not restricted to any particular cross sectional form of conduit, nor to the specific conduit construction herein disclosed, for the reason that said conduit may be varied in form and construction without departing from the spirit of the invention.

Although I have shown and described the chain operated within a conduit in a manner for the weight carrying rollers to ride upon the bottom of the conduit and for the direction rollers to ride into contact with the opposite walls of said conduit, thereby substantially reducing the frictional contact between the conveyer and the conduit, it is manifest that the weight carrying rollers will, in certain positions of the chain, contact with the upper walls of the conduit, particularly when the chain travels in an upwardly inclined direction. Accordingly, it is manifest that the frictional contact of the conveyer chain with all the walls of the conduit is minimized by the employment of the weight carrying and direction rollers.

Having thus fully described the invention, what I claim as new, and desire to secure by Letters Patent is:—

1. In a conveyer, a conduit, a hauling chain operating therein, a truck, a hanger swiveled on the truck to turn on a vertical axis, and a trigger carried by said hanger.

2. In a conveyer, a conduit, a hauling chain operating therein, a wheeled truck, a hanger mounted on the truck to turn on a vertical axis, and a latch or trigger carried by the hanger and coöperating with said chain.

3. In a conveyer, a hauling chain, a truck adapted to be moved by the operation of said chain, a hanger carried by the truck, a spring-actuated trigger mounted in the hanger and adapted to engage with said chain, and a trip positioned in the path of said trigger and operating, when engaged therewith, to repress the trigger for automatically releasing the same from the chain.

4. In a conveyer, a conduit, a hauling chain positioned therein, a hanger adapted to be carried by a truck, a trigger carried by the hanger and positioned for operation in the conduit so as to be connected to the chain, and a trip positioned in the path of the trigger and operating, when engaged therewith, to automatically disconnect said trigger from the chain.

5. In a conveyer, a conduit, a hauling chain operating therein, a truck, a wheel hanger pivoted to the truck to turn on a vertical axis, a yieldable trigger supported in said wheel hanger, said trigger connecting the truck to the chain, and a trip for releasing said trigger, whereby the trigger is disconnected from the hauling chain when the truck is free from the pull of said chain.

6. In a conveyer, a platform, a slotted conduit, a truck adapted to travel upon the platform, a roller chain certain links of which are constructed to sustain a part of the weight of the truck, said chain being positioned within the conduit and operating below the surface of the platform, and means connecting said truck with one of said links, whereby a portion of the weight of the truck and its load may be imposed upon said chain, and the movement of the chain imparts movement to the truck.

7. In a conveyer, a slotted conduit, a link chain operating therein, the links of said chain being connected by pivots, which pivots are at an angle to each other, rollers mounted on the chain and positioned for engagement with opposite walls and with the bottom, respectively, of said conduit, a wheeled truck, and means carried by the truck for operatively connecting said truck with said chain.

8. In a conveyer, a wheeled truck, a conduit, a roller chain operating in said conduit, certain links of said chain being constructed to sustain a part of the weight of a truck, a hanger pivotally mounted on said truck, and a movable trigger carried by said hanger, said trigger being adapted for engagement with certain links of said chain.

9. In a conveyer, a wheeled truck, a conduit, a roller chain provided with weight sustaining links, a hanger pivotally mounted to turn on said truck, a caster on said hanger, and a trigger mounted in said hanger, said trigger coöperating with the weight sustaining links of the roller chain.

10. In a conveyer, a conduit having a slot, a trip, a hauling chain operating in said conduit, a truck, a bearing plate thereon, a hanger keyed to said bearing plate, a trigger on said hanger, said trigger working in said slot of the conduit and adapted for engagement with said chain, and a shoulder on said trigger adapted to engage with the trip, whereby the trigger is disconnected from the hauling chain and the truck is released from the pull of said chain.

11. In a conveyer, a slotted conduit, a hauling chain operating therein, a truck, a bearing plate thereon, a hanger keyed to said bearing plate, and a trigger mechanism slidably mounted in said hanger, said trigger mechanism comprising a trigger having a shoulder, and, a spring positioned within a chamber of the hanger, said trigger being adapted for engagement with the links of said chain.

12. In a conveyer, a conduit having portions thereof positioned in different vertical planes and communicating with each other, a double-pivoted-link chain operating in said conduit and adapted to conform automatically to the contour thereof, said chain being provided with two sets of rollers, the rollers of one set being positioned to travel in contact with the side walls of the conduit, and the rollers of the other set being positioned to ride upon the bottom of the conduit, and a vehicle provided with means adapted to engage with said chain operating within the conduit.

13. In a conveyer, a conduit, all parts of which are in substantially the same transverse plane and different lengths of which are in different vertical planes, a chain positioned within the conduit, said chain being provided with weight carrying rollers and with direction rollers adapted to ride upon the bottom and the walls, respectively, of the conduit, whereby the chain will conform automatically to the contour of the conduit, a vehicle, and means connecting the vehicle with said chain for the purpose of imparting movement to the vehicle by the movement of the chain.

14. In a conveyer, a conduit the lengths of which are in different vertical planes and in communication with each other, a double jointed link chain operating in said conduit, anti-friction devices carried by said chain for engagement with the side walls of said conduit, other anti-friction devices positioned on said chain for traveling contact with the bottom of the conduit, said anti-friction devices being positioned at the joints of the links, a vehicle, and means carried by the vehicle for connecting the same with the chain, whereby said vehicle will be hauled upon a platform in the direction of said conduit.

15. In a conveyer, an endless conduit, an endless double jointed chain adapted to travel within, and to conform automatically to bends of, said conduit, anti-friction devices carried by said chain, said anti-friction devices being adapted for engagement with the bottom and the side walls of said conduit, means for imparting motion to said chain, a vehicle, and means for connecting the vehicle with said chain for imparting movement to the vehicle by the movement of the chain.

16. In a conveyer, a conduit all parts of which are in substantially the same transverse plane and different lengths of which are in different vertical planes, a flexibly jointed chain provided with weight carrying rollers and direction rollers adapted for engagement with the bottom and side walls, respectively, of the conduit, said chain being adapted to travel within, and to conform automatically to, the contour of said conduit, a vehicle, means for detachably connecting said vehicle with the chain for imparting movement to the vehicle, and means for automatically detaching said vehicle from the chain at a predetermined point in the length of the conduit.

17. In a conveyer, a conduit having a slot in one wall thereof, a double jointed link chain positioned within the conduit below the slot thereof, a plurality of series of rollers mounted on said chain at the axes of motion of the links thereof, the axes of the rollers of one series being at a right angle to the axes of motion of the other series, the rollers of one series being positioned for engagement with the side walls of the conduit, and the rollers of the other series being adapted to ride upon the bottom or the top of the conduit, a wheeled truck, and means carried by said truck for detachably connecting said truck with said chain.

18. In a conveyer, a conduit having portions thereof positioned in different vertical planes, a double jointed chain operating therein, said chain having two series of rollers positioned at respective joints thereof, the two series of rollers being adapted to travel in contact with the side walls and the bottom, respectively, of said conduit, a vehicle, and a trigger carried by the vehicle for engagement with said chain.

19. In a conveyer, a slotted conduit, a double jointed chain operating therein, said chain having a plurality of links pivoted at their meeting ends by horizontal pintles and other links pivoted to one of the link sections by vertical pintles, weight carrying rollers on the horizontal pintles, direction rollers on the vertical pintles, said rollers being adapted for engagement with the opposite walls and with the bottom, respectively, of said conduit, a wheeled truck, and means carried by the truck for operatively connecting said truck with said chain.

20. In a conveyer, a double jointed chain comprising a plurality of weight sustaining link sections, weight carrying rollers, and direction rollers carried by said chain, a conduit within which the chain is positioned for operation, a vehicle, and a trigger connected to said vehicle for turning movement on a vertical axis, said trigger coöperating with said chain.

21. In a conveyer, a conduit, a link chain positioned therein, the links of said chain being connected by two series of pivots, the pivots of one series being at an angle to the pivots of the other series, weight supporting rollers on the chain, direction rollers on said chain, a vehicle, and means for connecting said vehicle with said chain.

22. In a conveyer, a conduit, a vehicle, a link chain positioned within said conduit and provided with a plurality of series of rollers adapted to contact with the several walls of said conduit, the links of said chain being united by two series of pivots, the pivots of one series being at an angle to each other, and means for connecting the vehicle to said link chain.

23. In a conveyer, a conduit, a flexible roller chain positioned in said conduit and adapted to conform to bends thereof, said chain composed of links which are connected by two series of pivots, the pivots of one series being positioned at an angle to the pivots of the other series, said chain being provided on the pivots of one series with rollers adapted to travel in contact with the side walls of the conduit, and provided, also, on the pivots of the other series with rollers positioned to ride in contact with the bottom and top walls of the conduit, and means for connecting a vehicle to said chain.

24. In a conveyer, a conduit, a flexible chain the links of which are connected by pivotal pins, certain of said pivotal pins being at a right angle to other pivotal pins, rollers mounted on said pivotal pins, said rollers being adapted to ride in contact with the walls of said conduit, and means for connecting a vehicle to said chain.

25. In a conveyer, a conduit, and a flexible double-jointed chain positioned within said conduit and adapted to conform automatically to the bends or corners of said conduit, said chain being provided with rollers positioned to ride in contact with the side walls of the conduit.

In testimony whereof I have signed my name to this specification in the presence of two subscribing witnesses.

CHARLES A. MORRIS.

Witnesses:
H. I. BERNHARD,
J. F. MOTHERSHEAD.